US010655473B2

(12) United States Patent
Quach et al.

(10) Patent No.: US 10,655,473 B2
(45) Date of Patent: May 19, 2020

(54) GAS TURBINE ENGINE TURBINE BLADE LEADING EDGE TIP TRENCH COOLING

(71) Applicant: United Technologies Corporation, Hartford, CT (US)

(72) Inventors: San Quach, East Hartford, CT (US); Lane Thornton, Meriden, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1447 days.

(21) Appl. No.: 13/713,371

(22) Filed: Dec. 13, 2012

(65) Prior Publication Data

US 2014/0165593 A1 Jun. 19, 2014

(51) Int. Cl.
*F01D 5/18* (2006.01)

(52) U.S. Cl.
CPC .................................. *F01D 5/186* (2013.01)

(58) Field of Classification Search
CPC ... F01D 5/12; F01D 5/20; F01D 5/081; F01D 5/141; F01D 5/186; F01D 5/187; F02C 7/18; F04D 29/384; F05D 2240/303; F05D 2240/307; F05B 2260/201; F05B 2260/202; F05B 2260/205; Y02T 50/673; Y02T 50/676; Y02E 10/721; B54C 27/467
See application file for complete search history.

(56) References Cited

U.S. PATENT DOCUMENTS

| 5,476,364 | A | | 12/1995 | Kildea | |
|---|---|---|---|---|---|
| 5,660,523 | A | * | 8/1997 | Lee | .............................. 416/97 R |
| 6,164,914 | A | * | 12/2000 | Correia | .................... F01D 5/186 |
| | | | | | 415/115 |
| 6,179,556 | B1 | * | 1/2001 | Bunker | .................... F01D 5/187 |
| | | | | | 415/115 |
| 6,190,129 | B1 | * | 2/2001 | Mayer | ..................... F01D 5/187 |
| | | | | | 416/235 |
| 6,382,913 | B1 | * | 5/2002 | Lee | ......................... F01D 5/141 |
| | | | | | 416/92 |
| 6,955,522 | B2 | | 10/2005 | Cunha et al. | |
| 7,281,894 | B2 | | 10/2007 | Lee et al. | |

(Continued)

FOREIGN PATENT DOCUMENTS

| EP | 1367222 | 12/2003 |
|---|---|---|
| EP | 1793087 | 6/2007 |

(Continued)

OTHER PUBLICATIONS

International Preliminary Report on Patentability for International Application No. PCT/US2013/070050 dated Jun. 25, 2015.

(Continued)

*Primary Examiner* — Carlos A Rivera

(74) *Attorney, Agent, or Firm* — Carlson, Gaskey & Olds, P.C.

(57) ABSTRACT

An airfoil for a gas turbine engine includes pressure and suction walls spaced apart from one another and joined at leading and trailing edges to provide an airfoil having an exterior surface that extends in a radial direction to a tip. A tip trench is provided in the tip and wrapping at least a portion of the airfoil from the pressure side wall around the leading edge to the suction side wall. The tip trench is provided by a recess.

10 Claims, 3 Drawing Sheets

(56) References Cited

U.S. PATENT DOCUMENTS

| | | | |
|---|---|---|---|
| 7,497,660 B2 * | 3/2009 | Liang | 416/1 |
| 7,722,325 B2 | 5/2010 | Cunha | |
| 8,066,485 B1 | 11/2011 | Liang | |
| 8,105,030 B2 | 1/2012 | Abdel-Messeh et al. | |
| 8,109,725 B2 | 2/2012 | Abdel-Messeh et al. | |
| 8,113,779 B1 * | 2/2012 | Liang | F01D 5/186 |
| | | | 416/92 |
| 8,172,507 B2 | 5/2012 | Liang | |
| 2002/0122716 A1 | 9/2002 | Beacock et al. | |
| 2004/0013515 A1 | 1/2004 | Cherry et al. | |
| 2004/0126236 A1 | 7/2004 | Lee et al. | |
| 2010/0008758 A1 | 1/2010 | Cunia | |
| 2011/0097188 A1 | 4/2011 | Bunker | |
| 2011/0186550 A1 | 8/2011 | Gannelli et al. | |
| 2012/0189427 A1 * | 7/2012 | Kwon | F01D 5/20 |
| | | | 415/1 |
| 2012/0282108 A1 | 11/2012 | Lee et al. | |

FOREIGN PATENT DOCUMENTS

| | | |
|---|---|---|
| FR | 2891003 | 3/2007 |
| GB | 2 413 160 B | 8/2006 |

OTHER PUBLICATIONS

International Search & Written Opinion for PCT/US2013/070050. Search completed on Mar. 7, 2014.
Extended European Search Report for European Application No. 13863205.4 dated Nov. 13, 2015.

* cited by examiner

GAS TURBINE ENGINE TURBINE BLADE LEADING EDGE TIP TRENCH COOLING

BACKGROUND

This disclosure relates to a gas turbine engine. More particularly, the disclosure relates to a tip cooling configuration for an airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Turbine blades typically include internal cooling passages. Film cooling holes communicate cooling fluid from the cooling passages to areas on the exterior surface of the turbine blade that may experience high temperatures.

One high temperature area is the tip of the airfoil. A proposed cooling configuration uses a notch circumscribed about the entire perimeter of the airfoil at the tip, which permits leakage of the working fluid past the tip. The notch provides a flat surface or shelf that is parallel to the tip.

SUMMARY

In one exemplary embodiment, an airfoil for a gas turbine engine includes pressure and suction walls spaced apart from one another and joined at leading and trailing edges to provide an airfoil having an exterior surface that extends in a radial direction to a tip. A tip trench is provided in the tip and wrapping at least a portion of the airfoil from the pressure side wall around the leading edge to the suction side wall. The tip trench is provided by a recess.

In a further embodiment of any of the above, the recess has a curved cross-sectional shape.

In a further embodiment of any of the above, the tip trench is provided about a perimeter of the tip.

In a further embodiment of any of the above, the curved recess has a valley and a lip. The lip extends in the radial direction beyond the valley.

In a further embodiment of any of the above, the airfoil includes a cooling passage provided between the pressure and suction walls. Cooling holes fluidly connect the cooling passage to the tip trench.

In a further embodiment of any of the above, the tip includes a terminal end that is generally flat.

In a further embodiment of any of the above, the cooling holes are provided between the terminal end and the lip.

In a further embodiment of any of the above, the cooling holes are angled relative to the radial direction.

In a further embodiment of any of the above, the terminal end extends in the radial direction beyond the lip.

In a further embodiment of any of the above, the airfoil is a turbine blade.

In another exemplary embodiment, an airfoil for a gas turbine engine includes pressure and suction walls spaced apart from one another and joined at leading and trailing edges to provide an airfoil having an exterior surface that extends in a radial direction to a tip. A tip trench is provided in the tip and wrapping of the airfoil from the pressure side wall around the leading edge to the suction side wall. The tip trench is provided by a recess. The tip trench is provided about a perimeter of the tip. The recess has a valley and a lip. The lip extends in the radial direction beyond the valley. A cooling passage is provided between the pressure and suction walls. Cooling holes fluidly connect the cooling passage to the tip trench.

In a further embodiment of any of the above, the tip includes a terminal end that is generally flat. The cooling holes are provided between the terminal end and the lip.

In a further embodiment of any of the above, the terminal end extends in the radial direction beyond the lip.

In a further embodiment of any of the above, the cooling holes are angled relative to the radial direction.

In a further embodiment of any of the above, the airfoil is a turbine blade.

In a further embodiment of any of the above, the recess has a curved cross-sectional shape.

In another exemplary embodiment, a gas turbine engine includes a compressor and turbine section mounted to a shaft. A combustor is arranged between the compressor and turbine section. The gas turbine engine includes an airfoil in at least one of the compressor and turbine sections. The airfoil includes pressure and suction walls spaced apart from one another and joined at leading and trailing edges to provide an airfoil having an exterior surface that extends in a radial direction to a tip. A tip trench is provided in the tip and wrapping of the airfoil from the pressure side wall around the leading edge to the suction side wall. The tip trench is provided by a recess. The tip trench is provided about a perimeter of the tip. The recess has a valley and a lip. The lip extends in the radial direction beyond the valley. A cooling passage is provided between the pressure and suction walls. Cooling holes fluidly connect the cooling passage to the tip trench.

In a further embodiment of any of the above, the airfoil is in the turbine section.

In a further embodiment of any of the above, the gas turbine engine includes a blade outer air seal. The tip is arranged adjacent to the blade outer air seal.

In a further embodiment of any of the above, the recess has a curved cross-sectional shape.

BRIEF DESCRIPTION OF THE DRAWINGS

The disclosure can be further understood by reference to the following detailed description when considered in connection with the accompanying drawings wherein.

DETAILED DESCRIPTION

Figure 1:
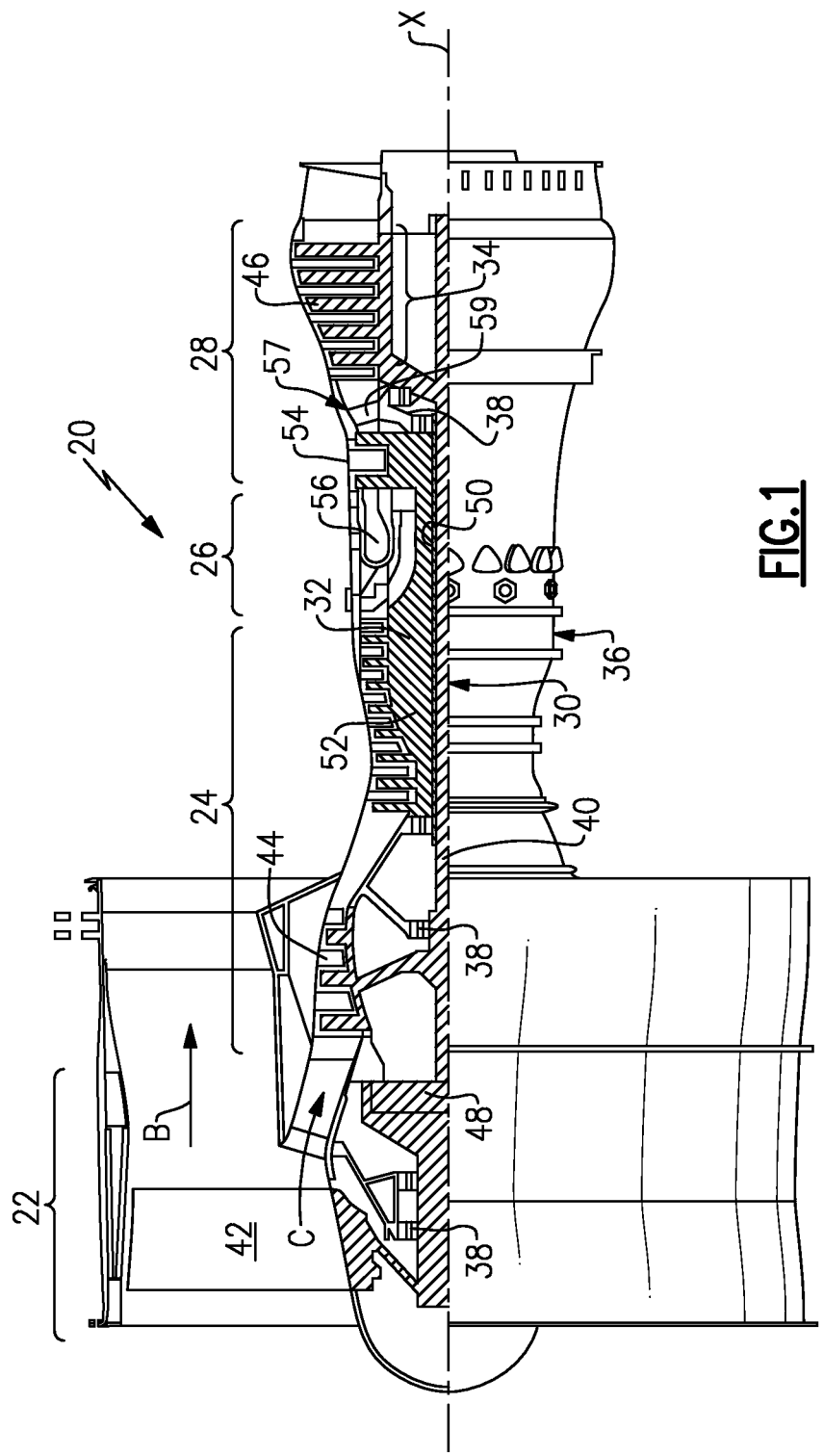
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

For exemplary purposes, a turbine blade 64 is described. It should be understood that any shape of cooling passage may also be used, such as serpentine and/or tip cooling flag, which run parallel to the tip.

Figure 2A:
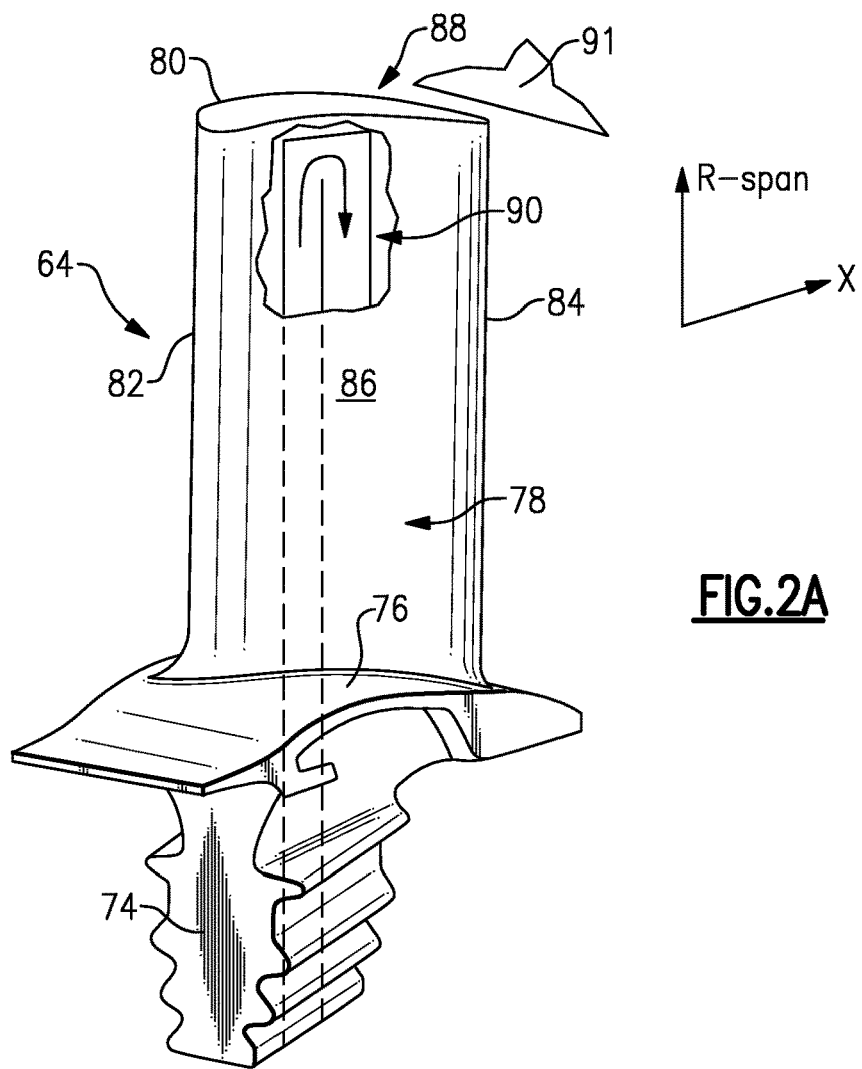
FIG. 2A is a perspective view of the airfoil having the disclosed cooling passage.
Figure 2B:
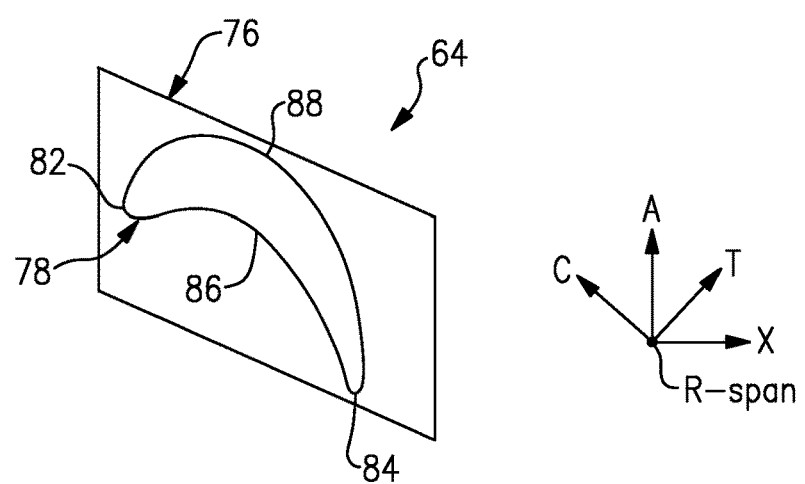
FIG. 2B is a plan view of the airfoil illustrating directional references.
Figure 3:
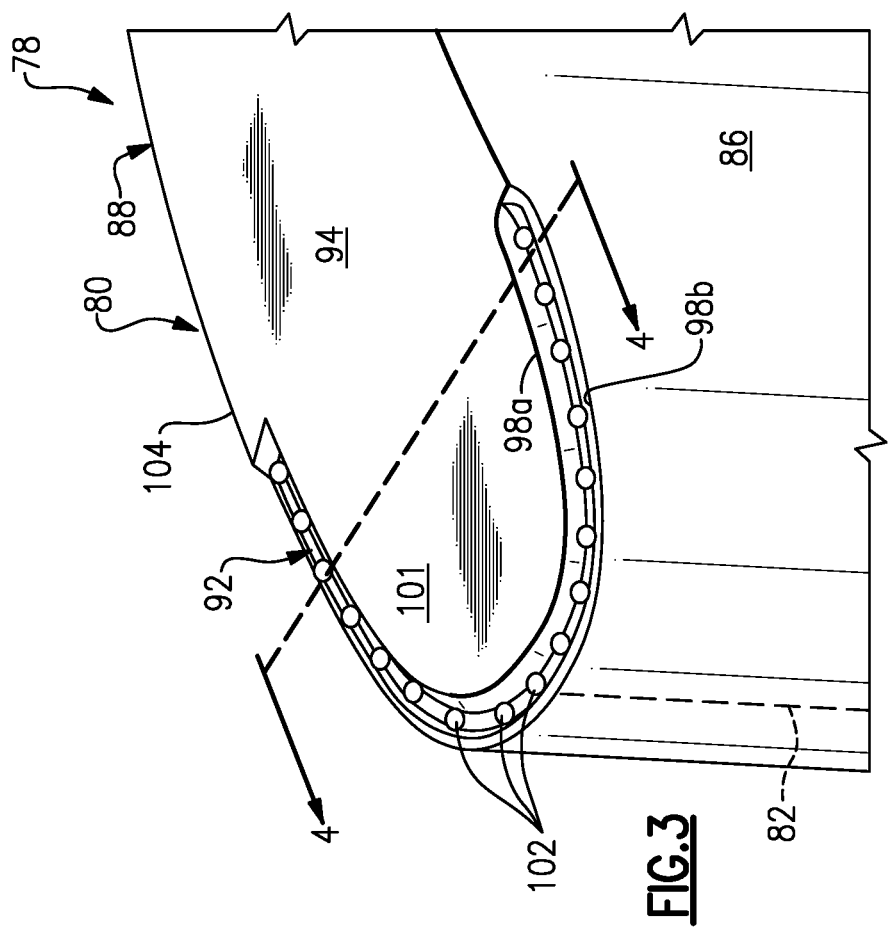
FIG. 3 is a perspective view of a cooling feature at a leading edge at a tip of the airfoil.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80 that has a perimeter 104 (FIG. 3). It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal 91 (shown in FIG. 2A).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Referring to FIG. 3, the tip 80 includes a terminal end 94 having a tip trench 92 that extends about a portion of a perimeter 104 of the exterior surface. The terminal end 94 is generally flat. In the example, the tip trench 92 wraps about or circumscribes a portion 101 of terminal end 94 at the tip 80 from a pressure side wall 86 around the leading edge 82 to a suction side wall 88.

Figure 4:
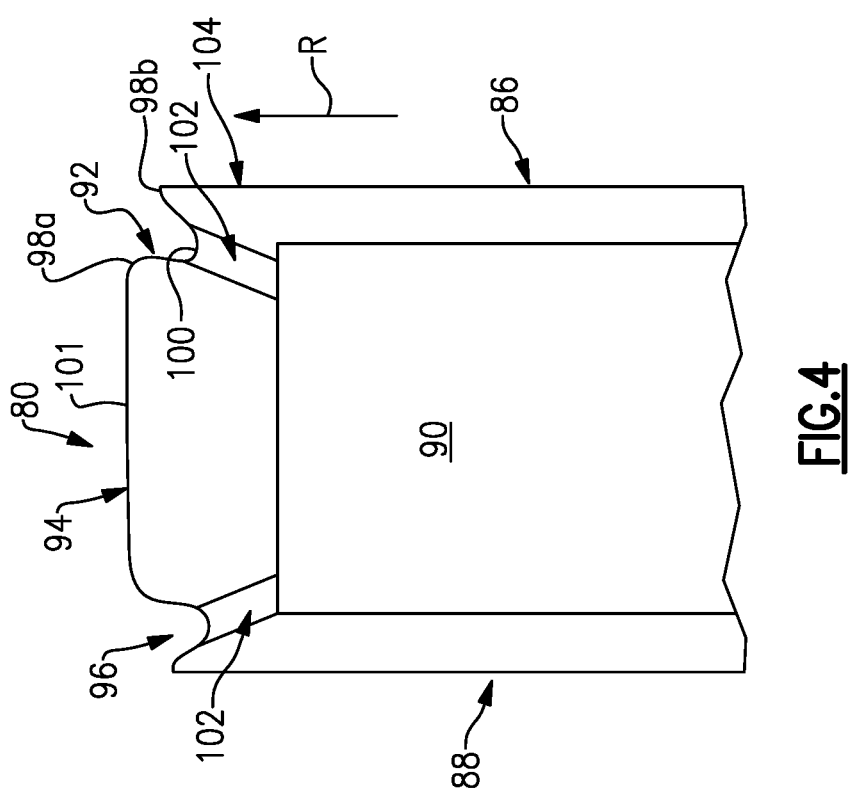
FIG. 4 is cross-sectional view of the airfoil tip along line 4-4 of FIG. 3.

As best shown in FIG. 4, the tip trench 92 is provided by a recess 96 bounded by first and second lips 98a, 98b, and which has a curved cross-section. The first lip 98a extends in the radial direction R beyond the second lip 98a. The portion 101 is inboard from the second lip 98b and adjoins the first lip 98a. Cooling holes 102 communicate cooling fluid from the cooling passage 90 to the tip trench 92.

The second lip 98b extends radially outwardly in the span direction R from a valley 100 of the recess 96 at the perimeter 104 to retain cooling fluid within the tip trench 92. The terminal end 94 extends radially outward in the span direction R beyond the second lip 98b. The tip trench 92 maintains a cushion of cooling air without the associated penalty due to the deviation of the aerodynamic shape of the blade.

Although example embodiments have been disclosed, a worker of ordinary skill in this art would recognize that certain modifications would come within the scope of the claims. For example, different type and arrangements of turbulence promoting features may be used. For that and other reasons, the following claims should be studied to determine their true scope and content.

What is claimed is:

1. An airfoil for a gas turbine engine comprising:
   pressure and suction side walls spaced apart from one another in a thickness direction and joined at leading and trailing edges to provide an airfoil having an exterior surface with a perimeter that extends in a radial direction to a tip having a terminal end; and
   a tip trench provided in the tip at an airfoil exterior and wrapping at least portion of the airfoil from the pressure side wall around the leading edge to the suction side wall, the tip trench provided by a recess that has a curved cross-sectional shape having a valley bounded by first and second lips, the first lip extends in the radial direction beyond the second lip, wherein the tip trench is provided about the perimeter of the tip such that the tip trench circumscribes a portion of the terminal end, the portion inboard from the second lip and adjoining the first lip, wherein the terminal end extends in the radial direction beyond the second lip, and the first lip is inboard from the second lip in the thickness direction.

2. The airfoil according to claim 1, comprising a cooling passage provided between the pressure and suction walls, and cooling holes fluidly connecting the cooling passage to the tip trench.

3. The airfoil according to claim 2, wherein the terminal end is generally flat.

4. The airfoil according to claim 3, wherein the cooling holes are provided between the terminal end and the second lip.

5. The airfoil according to claim 4, wherein the cooling holes are angled relative to the radial direction.

6. The airfoil according to claim 1, wherein the airfoil is a turbine blade.

7. A gas turbine engine comprising:
   a compressor and turbine section mounted to a shaft, and a combustor arranged between the compressor and turbine section; and
   an airfoil in at least one of the compressor and turbine sections, the airfoil including:
      pressure and suction side walls spaced apart from one another in a thickness direction and joined at leading and trailing edges to provide an airfoil having an exterior surface with a perimeter that extends in a radial direction to a tip having a terminal end;
      a tip trench provided in the tip at an exterior and wrapping of the airfoil from the pressure side wall around the leading edge to the suction side wall, the tip trench provided by a recess that has a curved cross-sectional shape having a valley bounded by first and second lips, the first lip extends in the radial direction beyond the second lip, wherein the tip trench is provided about the perimeter of the tip such that the tip trench circumscribes a portion of the terminal end, the portion inboard from the second lip and adjoining the first lip, wherein the terminal end extends in the radial direction beyond the second lip, and the first lip is inboard from the second lip in the thickness direction; and
      a cooling passage provided between the pressure and suction walls, and cooling holes fluidly connecting the cooling passage to the tip trench.

8. The gas turbine engine according to claim 7, wherein the airfoil is in the turbine section.

9. The gas turbine engine according to claim 8, comprising a blade outer air seal, the tip arranged adjacent to the blade outer air seal.

10. An airfoil for a gas turbine engine comprising:
    pressure and suction side walls spaced apart from one another in a thickness direction and joined at leading and trailing edges to provide an airfoil having an exterior surface with a perimeter that extends in a radial direction to a tip having a terminal end; and
    a tip trench provided in the tip at an airfoil exterior and wrapping at least portion of the airfoil from the pressure side wall around the leading edge to the suction side wall, the tip trench provided by a recess that has a curved cross-sectional shape having a valley bounded by first and second lips, the first lip extends in the radial direction beyond the second lip, wherein the terminal end extends in the radial direction beyond the second lip, and the first lip is inboard from the second lip in the thickness direction.

* * * * *